United States Patent Office 2,710,286
Patented June 7, 1955

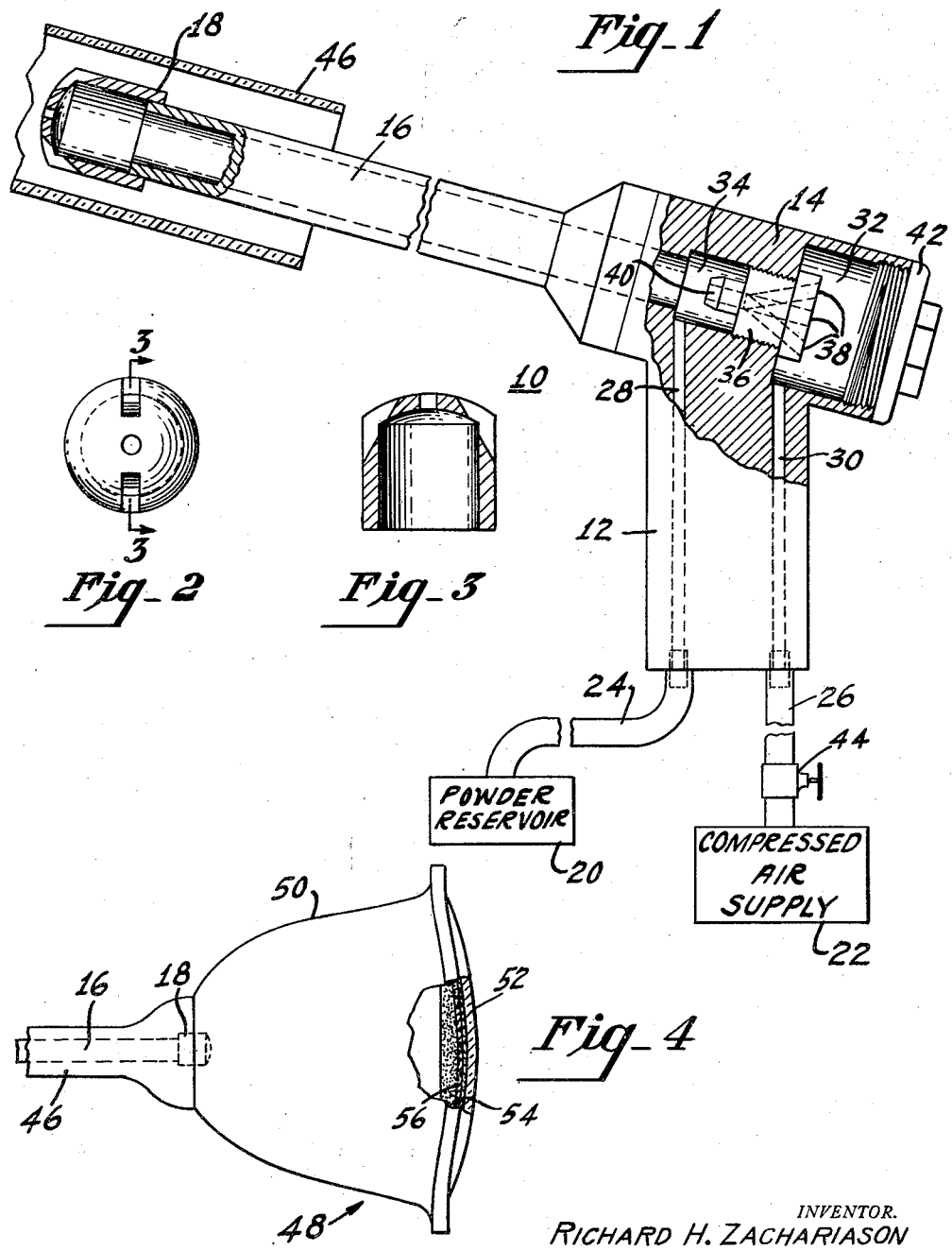

2,710,286

METHOD OF REMOVING AND SALVAGING ADHERENT MATERIALS

Richard H. Zachariason, Lancaster, Pa., assignor to Radio Corporation of America, a corporation of Delaware Application February 25, 1953, Serial No. 338,692

16 Claims. (Cl. 252—301.6)

This invention relates to cathode ray tubes and particularly to apparatus for and a method of removing fluorescent and other materials from viewing screens of such tubes.

A cathode ray tube is one having an elongated envelope with an electrode structure or electron gun at one end for forming a cathode ray beam which is focused and scanned over a fluorescent screen at the other end of the envelope to produce an image or picture thereon. Such a fluorescent screen may comprise blue fluorescing zinc sulfide and yellow fluorescing zinc cadmium sulfide in the desired proportions to provide a white luminescence, for example. In the manufacture of the tube the fluorescent phosphor material is mixed with other materials, such as a water soluble silica binder, for example, which facilitate settling the phosphors on and their adherence to the glass face plate of the cathode ray tube. In addition, the side of the fluorescent screen facing the electron gun may be provided with an electron pervious mirror-like film of aluminum or other metallic backing which improves the image reproduction quality of the kinescope.

During the manufacture of cathode ray tubes a substantial number of tubes are rejected as failing to meet certain standards of performance. Since the tube components, especially the tube envelope, are costly, an effort is made to salvage parts which may be re-processed and used in other tubes. In the case of the tube envelope, re-processing usually involves removal of the fluorescent materials or phosphors from the viewing screen or face plate of the tube.

In the past, fluorescent materials have been removed from cathode ray tubes by means of acid solutions. This method has proven satisfactory for use with glass cathode ray tubes (or kinescopes, as television picture tubes are usually called) and some metal tubes. However, the present trend is to construct the metal envelopes of kinescopes of cold rolled steel, which is much cheaper than the high-chrome steels now used for that purpose. The use of cold rolled steel in the cone of the tube requires that a glass having matching physical characteristics, that is, a high coefficient of thermal expansion, be used for the face plate and the glass neck of the tube. Both the glass and cold rolled steel are by their nature characterized by poor resistance to chemical attack, so acid solutions as a means for removing phosphor materials cannot be used in this case.

Another disadvantage of using acid to remove fluorescent materials from screens is that chemical reactions take place with the phosphors as well as the wanted reaction with the silicate which is used to make the screen adhere to the face plate. Consequently, the phosphors thus removed are wasted, because the cost of salvaging the phosphor and reclaiming it is more than the cost of preparing new phosphors. Additional disadvantages of acid removal of screens are that toxic by-products may be produced by chemical reaction between the acid and the phosphors, and the fact that the acid itself is rather costly.

A principal object of the present invention is to provide an improved method of and means for removing fluorescent screens from cathode ray tubes.

A further object of the present invention is to provide a method and means for removing phosphors from a cathode ray tube in a readily salvageable form.

Another object of the present invention is to provide a means for removing fluorescent screens from kinescope face plates which is free from the dangers of toxicity which were inherent in the prior art method.

Yet another object of the present invention is to provide a novel and more economic means for removing screens from cathode ray tubes.

The above and related objects are accomplished in accordance with the present invention by directing a jet of gas-abrasive mixture towards the screen which is to be removed. The gas-abrasive mixture is applied through a nozzle which is inserted into the interior of the tube envelope via the tube neck or other opening in the tube envelope. The abrasive used is preferably water soluble in order that abrasive particles adhering to the interior of the tube may be readily removed by washing the tube interior with water. Air is the gas (or, more correctly, mixture of gases) which is usually used. The requirements for the abrasive if the phosphors are to be salvaged conveniently, in addition to being water soluble, are that it be physically capable of removing aluminized or non-aluminized viewing screen materials, yet will not pit the face plate or other base for the viewing screen. Further, if the phosphors from an aluminized screen are to be readily salvageable, a water solution of the abrasive must dissolve the aluminum or other backing while not having any adverse chemical effect on the phosphors or the interior of the tube envelope. Sodium carbonate and potassium carbonate, among others, are suitable, but sodium carbonate is preferable from a cost standpoint.

The use of the gas-abrasive mixture to remove fluorescent screens eliminates dangers of chemical reaction with the glass, metal, and phosphors which are inherent with acid screen removal processes. Compressed air and a cheap water soluble abrasive, such as sodium carbonate, are considerably more economical than the acid formerly used to accomplish the screen removal. Because the abrasive is water soluble, it is also possible to readily separate phosphors from the abrasive by subjecting the abrasive-phosphor residue to a water washing treatment, thus allowing the phosphors to be salvaged. The silica binder in the phosphor screen is also water soluble, and is removed along with the abrasive.

Referring to the accompanying drawings:

Fig. 1 is an elevational view, partly in section, of an apparatus, including an air "gun," suitable for the practice of the method of the present invention, the barrel and nozzle of the "gun" being presented to the interior of a cathode ray tube;

Fig. 2 is an end view of the nozzle of the gun of Fig. 1;

Fig. 3 is a section view taken along the lines 3—3 of Fig. 2; and

Fig. 4 is an elevation view, partly in section, of a typical cathode ray tube envelope on which the gun apparatus of Fig. 1 may be used to remove adherent materials from the interior thereof.

Referring to Figs. 1 and 4, the gun 10 comprises a handle 12, a double chamber 14, barrel 16, and nozzle 18. A reservoir 20 for storing abrasive powder and a source of compressed air 22 are connected to the mixing chamber 14 via tube or hoses 24, 26 and channels 28, 30, respectively, in the handle 12. The reservoir 20 may be provided with a vibrator (not shown) to prevent the abrasive powder from "packing."

The chamber 14 includes a portion 32 into which the compressed air from source 22 is fed and a smaller portion 34 into which the powder is drawn through the tube 24 and channel 28 as the air passes through the smaller chamber 34.

A threaded bushing 36 has three channels 38a, b, c, feeding into a centrally located channel 40 through which air or gas passes from the portion 32 into the smaller chamber 34 and out the barrel 16 to the nozzle 18. A threaded end cap 42 is provided at one end of the chamber portion 32. Removal of the end cap 42 permits the channels 38 in bushing 36 to be easily cleaned should they become plugged by foreign matter present in the compressed air which passes therethrough.

Referring to Figs. 1, 2, and 3, nozzle 18 is illustrated as having three apertures 44 through which jets of gas-abrasive mixture escape. Other nozzles having differently arranged apertures could be substituted provided the mixture were sprayed in a pattern which would facilitate removal of the screen in the desired location.

In practice, the barrel of the gun 10 is inserted through the neck 46 of the cathode ray tube envelope 48 until the nozzle 18 extends into the metal shell 50 of the tube as illustrated in Fig. 4. The tube envelope 48 comprises the glass neck 46, metal shell 50, face plate 52, phosphor screen 54 which adheres to face plate 52 and aluminized or other reflective or metallic electron pervious backing material 56. The jet flow is controlled by a valve 44 in the compressed air line. With 40 pounds gauge pressure on the air line, approximately 20 seconds is required to remove an aluminized fluorescent screen from a typical 27 inch kinescope. The time required would, in any case, vary in accordance with the pressure of the compressed air supply, number, size, and location of the apertures in the nozzle 18, and the area and type of screen to be removed. Further, while a hand operated type gun 10 has been described, the method of the present invention is readily adaptable to use in automatic multiple position tube making machinery.

To salvage the phosphors, the abrasive-phosphor residue is passed through water baths which dissolve the silica binder and dissolve the sodium carbonate abrasive which is used. Dissolving the sodium carbonate in water forms a weak alkaline solution and the aluminum from the backing layer is soluble in this weakly basic solution while there is no adverse reaction of the solution with the phosphors. Thus, the binder and the aluminum as well as the abrasive may all be separated from the phosphors by filtration.

A final water bath of pure water, either distilled water or de-ionized water, is given the phosphors before any aggregations of particles are broken up and the phosphors are reused in a tube.

To insure removal of any particles of abrasive which may have adhered to the interior of the tube envelope, the envelope's interior is washed with a water bath in which the abrasive is dissolved. Other materials, potassium carbonate, for example, could be used as the abrasive powder.

Thus, the present invention provides a means for removing phosphors, silica binder, and other materials such as an aluminum or beryllium coating from the interior of a cathode ray tube envelope. The invention also provides a means for inexpensively and simply salvaging the phosphors thus removed by using a water bath to dissolve the silica binder and the water soluble abrasive which, when in solution, forms a weak basic solution which then dissolves and removes the aluminum or beryllium which adheres to the phosphors without contaminating the phosphor particles.

What is claimed is:

1. The process of removing and salvaging water-insoluble fluorescent phosphor material from a cathode-ray screen of the type wherein said material is secured to a screen plate by means of a water-soluble binder and is covered by an electron-transparent aluminum coating and wherein said phosphor material is such that it will not react chemically with a water solution of alkali metal carbonate, said process comprising: directing upon said screen a jet containing a powdered alkali metal carbonate, whereby to remove said material, said binder, and said aluminum from said plate; subjecting the resulting mixture of screen materials and powdered alkali metal carbonate to a water bath to form an alkaline solution in which said powdered alkali metal carbonate, said binder, and said aluminum are dissolved, and then removing said material from said bath water.

2. A process in accordance with claim 1, wherein said fluorescent phosphor material is subjected to at least one additional bath in pure water prior to filtering said material.

3. The process of removing and salvaging water-insoluble fluorescent phosphor material from a cathode-ray screen of the type wherein said material is secured to a screen plate by means of a water-soluble binder and is covered by an electron-transparent aluminum coating and wherein said phosphor material is such that it will not react chemically with a water solution of alkali metal carbonate, said process comprising: directing upon said screen a jet containing a powdered alkali metal carbonate, whereby to remove said material, said binder, and said aluminum from said plate; subjecting the resulting mixture of screen materials and powdered alkali metal carbonate to a water bath to form a weak alkaline solution in which said powdered alkali metal carbonate, said binder and said aluminum are dissolved and in which said material is not chemically affected, and then filtering the bath water to remove said material therefrom.

4. The process of removing screen materials comprising water-insoluble fluorescent phosphor material which will not react chemically with a water solution of alkali metal carbonate, a water soluble binder and an aluminum backing from the viewing screen of a cathode ray tube envelope and for salvaging said phosphor material, said process comprising: the steps of directing an abrasive water-soluble alkali metal carbonate powder suspended in a gaseous medium upon said screen to remove said screen materials, subjecting the resultant mixture to at least one water bath to dissolve said binder and said abrasive powder, said dissolved abrasive powder forming an alkaline solution in which said aluminum backing is dissolved but said phosphor material is chemically unaffected, filtering the liquid from said phosphor material, drying said phosphor material, and breaking up any particle aggregations of phosphor material which occur.

5. The process of removing screen materials comprising fluorescent phosphor material which will not react chemically with a water solution of alkali metal carbonate, a water soluble binder, and an aluminum backing from the viewing screen of a cathode ray tube, said process comprising the steps of directing an alkali metal carbonate powder suspended in a gaseous medium upon said viewing screen to remove said materials therefrom, emptying said tube, and then washing the interior of said tube with water to dissolve and to remove any of said aluminum backing, said binder or said powder which may have remained therein.

6. The process of removing screen materials comprising fluorescent phosphor material which will not react chemically with a water solution of alkali metal carbonate and a water soluble binder from the viewing screen of a cathode ray tube, said process comprising the steps of directing an alkali metal carbonate powder suspended in a gaseous medium upon said screen to remove said materials, emptying said tube, and subjecting the interior of said tube to a water bath to dissolve any particles of binder or powder which may remain adhered thereto.

7. The process of removing screen materials comprising fluorescent phosphor material which will not react chemically with a water solution of alkali metal carbonate, a water soluble binder and an aluminum backing from the viewing screen of a cathode ray tube and for salvaging the phosphor material therefrom, said process comprising the steps of directing a stream of air and sodium carbonate powder upon said screen to remove said adherent materials, emptying said tube, subjecting the resulting mixture of removed materials and sodium carbonate powder to at least one water bath to dissolve said binder and said powder, said dissolved powder forming an alkaline solution in which said aluminum backing is dissolved and said phosphor material is chemically unaffected, and filtering the liquid from said phosphor material.

8. The process of removing adhering materials comprising fluorescent phosphor material which will not react chemically with a water solution of alkali metal carbonate, a water soluble binder and an aluminum backing from a viewing screen of a cathode ray tube envelope and for salvaging the phosphor material therefrom, said process comprising the steps of directing a mixture of air and an alkali metal carbonate powder toward said screen to remove said adhering materials, emptying said envelope, subjecting the resultant mixture of removed materials and carbonate powder to at least one water bath to dissolve said binder and said carbonate, said dissolved carbonate forming an alkaline solution in which said aluminum backing is dissolved but said phosphor material is chemically unaffected, filtering the liquid from said phosphor material, drying said phosphor material, and breaking up any particle aggregations of phosphor material which occur.

9. The process of removing adhering materials comprising fluorescent phosphor material which will not react chemically with a water solution of alkali metal carbonate, a water soluble binder, and an aluminum backing from a viewing screen of a cathode ray tube, said process comprising the steps of directing sodium carbonate powder suspended in a gaseous medium toward said adhering materials to loosen said materials, removing said loosened materials and said powder from said envelope, and then washing the interior of said envelope with water to dissolve any of said binder or powder which may remain adhered to said envelope.

10. The process of removing adhering materials comprising fluorescent phosphor material which will not react chemically with a water solution of alkali metal carbonate and a water soluble binder from a viewing screen of a cathode ray tube, said process comprising the steps of directing a stream of sodium carbonate powder suspended in a gaseous medium toward said screen to loosen said materials, removing said loosened materials and said powder, and subjecting the interior of said tube to a water bath to dissolve any particles of binder or powder which may remain adhered thereto.

11. The process of removing screen materials comprising fluorescent phosphor material which will not react chemically with a water solution of alkali metal carbonate, a water soluble binder and an aluminum backing from a viewing screen of a cathode ray tube and for salvaging the phosphor material therefrom, said process comprising the steps of directing a stream of an alkali metal carbonate powder suspended in a gaseous medium toward said screen to remove said screen materials, emptying said resulting mixture, subjecting said mixture to at least one water bath to dissolve said binder and said powder, said dissolved powder forming an alkaline solution in which said aluminum backing is soluble and said phosphor material is chemically unaffected, filtering the liquid from said phosphor material, subjecting said phosphor material to a bath of pure water, and drying said phosphor material.

12. The process of removing and salvaging water-insoluble fluorescent phosphor material which will not react chemically with a water solution of alkali metal carbonate from a cathode-ray screen of the type wherein said phosphor material is secured to a screen plate by means of a water-soluble binder, said process comprising: directing upon said screen a jet containing an alkali metal carbonate powder to remove said phosphor material and said binder from said plate; subjecting the resulting mixture of screen materials and powder to a water bath to form an alkaline solution in which said alkali powder and said binder are dissolved, and then removing said phosphor material from said bath water.

13. A process in accordance with claim 12, wherein said phosphor material is subjected to at least one additional bath in pure water prior to filtering said phosphor material.

14. The process of removing screen materials comprising fluorescent phosphor material which will not react chemically with a water solution of alkali metal carbonate and a water soluble binder from the viewing screen of a cathode ray tube envelope and for salvaging said phosphor material, said process comprising: the steps of directing a stream of air containing an abrasive water-soluble alkali metal carbonate powder upon said screen to remove said screen materials, subjecting the resultant mixture to at least one water bath to dissolve said binder and said abrasive powder, filtering the liquid from said phosphor material, drying said phosphor material, and breaking up any particle aggregations of phosphor material which occur.

15. The process of removing and salvaging water-insoluble fluorescent phosphor material which will not react chemically with a water solution of alkali metal carbonate from a cathode-ray screen of the type wherein said phosphor material is secured to a screen plate by means of a water-soluble binder and is covered by an electron-transparent metallic coating, said process comprising: directing upon said screen a jet containing an alkali metal carbonate powder, whereby to remove said phosphor material, said binder, and said metallic coating from said plate; subjecting the resulting mixture of screen materials and powder to a water bath to form a solution in which said powder, said binder and said metallic coating are dissolved and in which said phosphor material is not chemically affected, and then filtering the bath water to remove said phosphor material therefrom.

16. The process of removing and salvaging water-insoluble fluorescent phosphor material which will not react chemically with a water solution of alkali metal carbonate from a cathode-ray screen of the type wherein said material is secured to a screen plate by means of a water-soluble binder and is covered by an electron-transparent conductive coating, said process comprising: directing upon said screen a jet containing an alkali metal carbonate powder, whereby to remove said phosphor material, said binder, and said conductive coating from said plate; subjecting the resulting mixture of screen materials and powder to a water bath to form a solution in which said powder, said binder, and said conductive coating are dissolved, and then filtering the bath water to remove said phosphor material therefrom.

No references cited.